(12) United States Patent
Muramatsu et al.

(10) Patent No.: US 7,032,732 B2
(45) Date of Patent: Apr. 25, 2006

(54) TWO-WAY CLUTCH

(75) Inventors: Kazuhiko Muramatsu, Fukuroi (JP);
Takaya Yamada, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/802,915

(22) Filed: Mar. 18, 2004

(65) Prior Publication Data
US 2004/0188214 A1    Sep. 30, 2004

(30) Foreign Application Priority Data
Mar. 20, 2003 (JP) ............................ 2003-078322

(51) Int. Cl.
*F16D 41/08* (2006.01)
(52) U.S. Cl. .................. 192/38; 192/44; 192/113.32
(58) Field of Classification Search .................. 192/37, 192/38, 113.32
See application file for complete search history.

(56) References Cited

U.S. PATENT DOCUMENTS

| | | | | |
|---|---|---|---|---|
| 3,055,471 A | * | 9/1962 | Warn et al. .................... | 192/45 |
| 3,295,625 A | | 1/1967 | Ordorica et al. .............. | 180/44 |
| 3,623,581 A | * | 11/1971 | Livezey ........................ | 192/45 |
| 4,848,508 A | * | 7/1989 | Smirl et al. .................. | 180/248 |
| 5,529,158 A | * | 6/1996 | Itoh et al. .................... | 192/35 |
| 5,732,807 A | * | 3/1998 | Itoh et al. .................... | 192/38 |
| 5,915,514 A | * | 6/1999 | Nojiri et al. .................. | 192/38 |

FOREIGN PATENT DOCUMENTS

| | | |
|---|---|---|
| JP | 06-344796 | 12/1994 |
| JP | 07-042767 | 2/1995 |
| JP | 09-025959 | 1/1997 |
| JP | 10-053044 | 2/1998 |
| JP | 2002-005200 | 1/2002 |

* cited by examiner

Primary Examiner—Richard M. Lorence
(74) Attorney, Agent, or Firm—Miles & Stockbridge P.C.

(57) ABSTRACT

A two-way clutch comprises an inner race element provided with one of a cam surface and a cylindrical surface, an outer race element provided with the other of the cam surface and the cylindrical surface, torque transmission members interposed between the cam surface and the cylindrical surface for performing torque transmission therebetween, springs for biasing the torque transmission members in a direction substantially along the cam surfaces, and a cage for retaining the torque transmission members and the biasing means, the cage being supported to be rotatable relative with the cam surfaces. The cage is elastically retained by elastic retaining means at a position where the torque transmission members are in the respective neutral conditions with respect to the cam surface. The springs are provided only on one side of the torque transmission members.

18 Claims, 5 Drawing Sheets

TWO-WAY CLUTCH

This application claims the benefit of Japanese Patent application No. 2003-078322 which is hereby incorporated by reference.

BACKGROUND OF THE INVENTION

1. Field of the Invention

The present invention relates to a two-way clutch used in a power transmission mechanism, an auxiliary machinery or accessory driving system, or the like, of a car.

2. Related Background Art

A two-way clutch is used as means for switching power transmission paths in a power transmission mechanism, a driving system for an accessory, or the like, of a car. For example, in a hybrid car having two power sources including an internal combustion engine and an electric motor, when the car is driven by the electric motor, in addition to the internal combustion engine, a rotation of the electric motor is transmitted to an output shaft through a two-way clutch in both directions of forward and backward rotations. A two-way clutch is employed also in an accessory driving system additionally using an electric motor, a center differential gear of a four-wheeled vehicle, or the like. (See, for example, Japanese Patent Application Laid-Open No. 2002-5200 (page 3, FIG. 3), Japanese Patent Application Laid-Open No. 6-344796 (page 3, FIG. 2), Japanese Patent Application Laid-Open No. 10-53044 (page 4, FIG. 2), Japanese Patent Application Laid-Open No. 7-42767 (page 2, FIG. 2), Japanese Patent Application Laid-Open No. 9-25959 (page 4, FIG. 1) and U.S. Pat. No. 3,295,625 (page 1, FIG. 2))

The two-way clutch described above employs such a structure that a cylindrical surface is formed on either one of an inner race element and an outer race element, the cam surfaces are formed on the other of the inner race element and the outer race element, and the torque transmission members such as rollers or sprags are interposed between the cylindrical surface and the respective cam surfaces, so that each torque transmission member is retained at the neutral position or one of engagement positions of the cam surface and the phases of a cage for retaining the torque transmission members are changed by the use of an electromagnetic clutch mechanism or a frictional drive mechanism. However, in such a clutch in which the torque transmission members are retained at the respective neutral positions of the cam surfaces, each torque transmission member is retained by two biasing means inside the cage, so that the number of constituent parts and the manufacturing cost are increased. On the other hand, in such a clutch in which the torque transmission members are retained respectively at the engagement positions of the corresponding cam surfaces, the cylindrical surface and the torque transmission members are brought into sliding contact with each other so that fuel expenses or the like may be increased due to a dragging torque when the two-way clutch is not operated.

The present invention has be contrived taking the above circumstances into consideration, and an object thereof is to provide a two-way clutch with a less power loss in a comparatively simple structure.

In order to solve the above problems, according to the present invention, there is provided a two-way clutch comprising: an inner race element provided with one of a cam surface and a cylindrical surface; an outer race element provided with the other of the cam surface and the cylindrical surface; a torque transmission member interposed between the cam surface and the cylindrical surface for performing torque transmission between the inner race element and the outer race element; biasing means for biasing the torque transmission member in a direction substantially along the cam surface; and a cage for retaining the torque transmission member and the biasing means, the cage being supported to be rotatable relative with the cam surface, wherein the cage is elastically retained by elastic retaining means at a position where the torque transmission member is in a neutral condition with respect to the cam surface, and the biasing means is provided only on one side of the torque transmission member.

According to an aspect of the present invention, the two-way clutch may further comprise an extension portion formed on the cage to be extended in the axial direction with respect to either the inner race element or the outer race element whichever serves as a cam surface side element having the cam surface; and frictional drive means interposed between the extension portion and the cam surface side element for frictionally transmitting a rotary force of the cam surface side element to the cage to thereby rotate the cage relatively with the cam surface side element.

The two-way clutch of the aspect of the present invention, the frictional drive means may comprise: a differential element or a stationary element which is retained to be rotatable relatively with the extension portion; a frictional surface which is formed integrally with or separately from the extension portion to be slidably contacted with the differential element or the stationary element; another frictional surface which is formed integrally with or separately from the differential element or the stationary element to be slidably contacted with the extension portion; and pressing means for bringing a frictional surface on the side of the differential element or the stationary element into pressure contact with a frictional surface on the side of the extension portion.

In the two-way clutch of the present invention, the inner race element may be provided with a lubricating oil path for supplying a lubricating oil to a contact portion between the inner race element and the torque transmission member.

In the two-way clutch of the present invention, the cage may be provided with a lubricating oil path for supplying a lubricating oil to the frictional surface of the frictional drive means.

In the two-way clutch of the present invention, the torque transmission member may be a roller.

DETAILED DESCRIPTION OF THE PREFERRED EMBODIMENT

Figure 1:
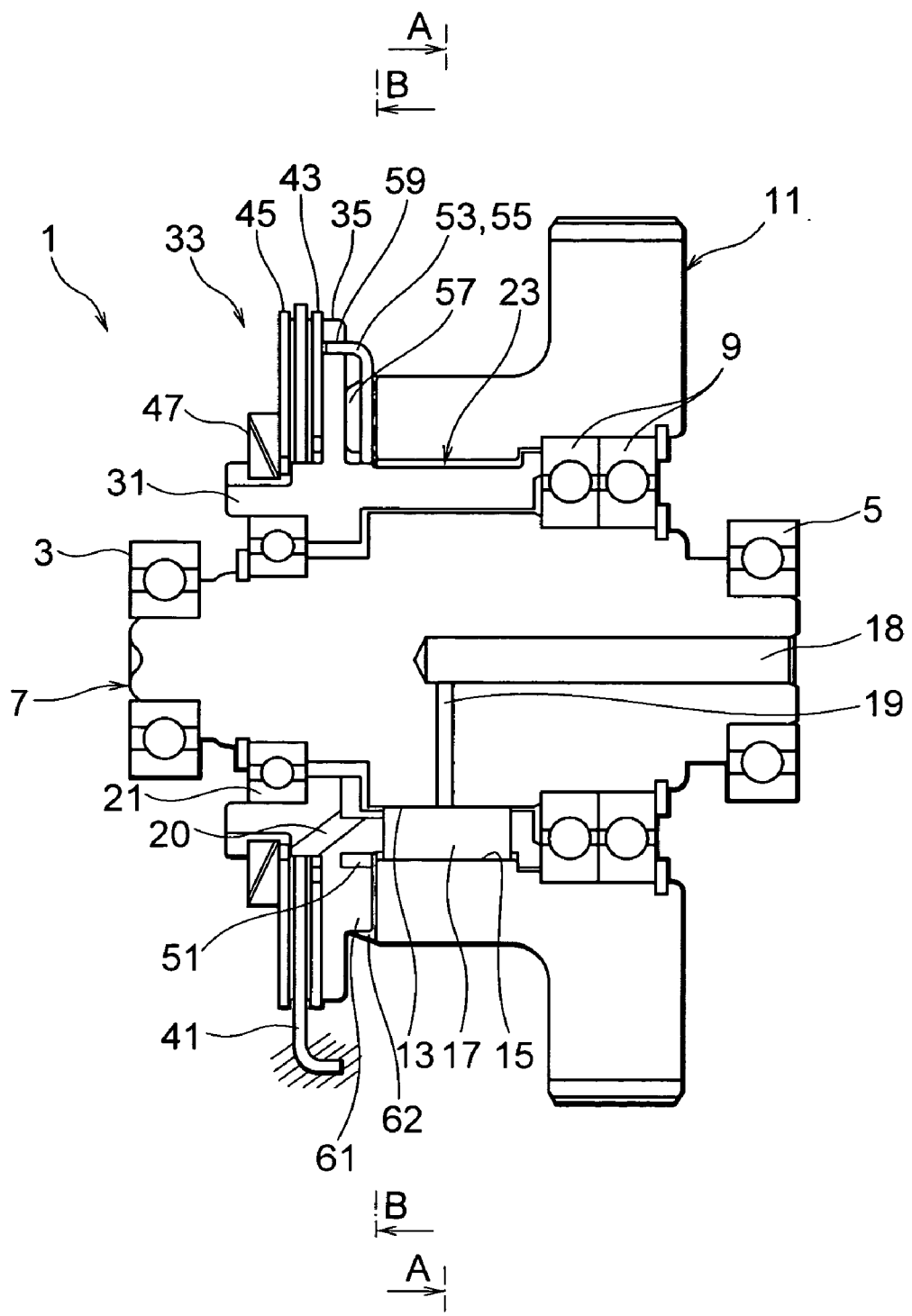
FIG. 1 is a longitudinal sectional view of a two-way clutch according to an embodiment of the invention.

Detailed description will be made below on an embodiment in which the present invention is applied to a two-way clutch in a power transmission mechanism of a hybrid car, with reference to drawings. FIG. 1 is a longitudinal sectional view of a two-way clutch according to the embodiment, FIG. 2 is a sectional view taken along the line A—A in FIG. 1, and FIG. 3 is a sectional view taken along the line B—B in FIG. 1.

Figure 2:
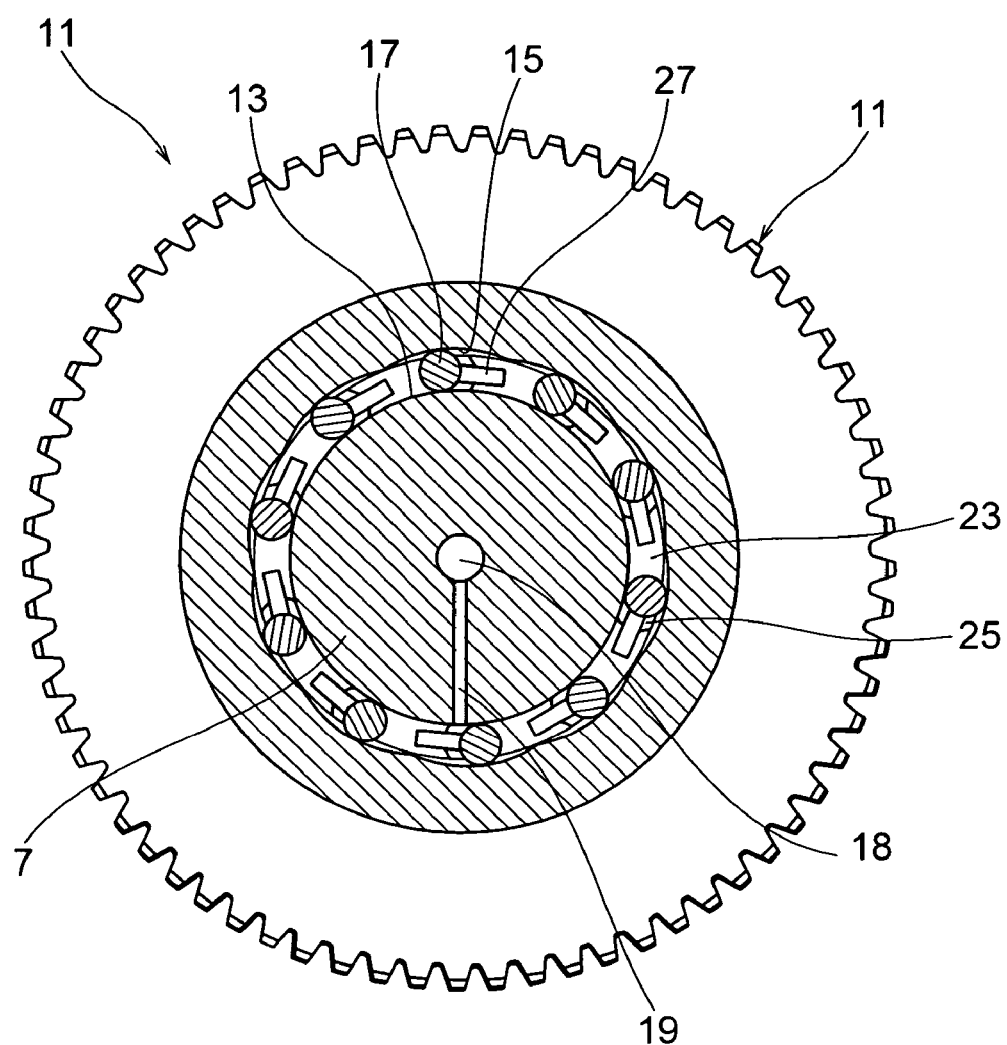
FIG. 2 is a sectional view taken along the line A—A in FIG. 1.
Figure 3:
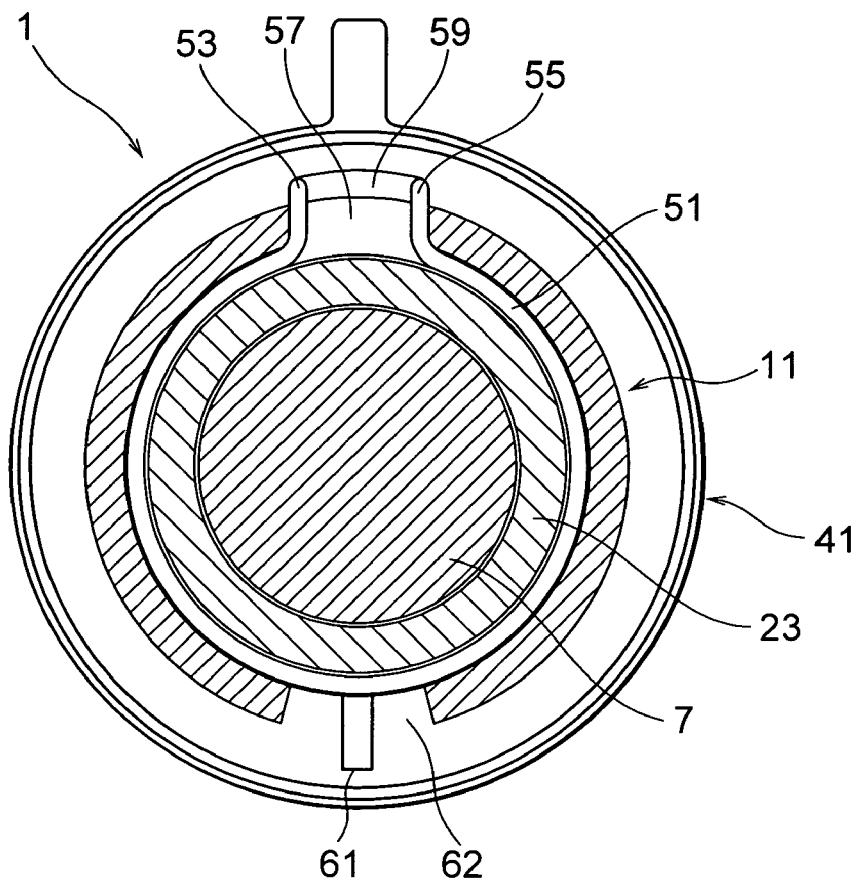
FIG. 3 is a sectional view taken along the line B—B in FIG. 1.

As shown in FIGS. 1 to 3, the two-way clutch 1 of this embodiment comprises an output shaft 7 which is an inner race element and is supported by an unrepresented housing through bearings 3 and 5, and a gear 11 which is an outer race element and is connected to an unrepresented electric motor. The gear 11 is supported by the output shaft 7 through a bearing 9.

While a cylindrical surface 13 is formed on the outer periphery of the output shaft 7, a plurality of cam surfaces (ten cam surfaces in this embodiment) 15 are formed on the inner periphery of the gear 11, and a roller as a torque transmission member 17 is interposed between the cylindrical surface 13 and each of the cam surfaces 15. In FIG. 1, lubricating oil paths 18 and 19 are formed through the output shaft 7 for supplying a lubricating oil to contact portions between the cam surfaces 15 and the roller 17.

Figure 4:
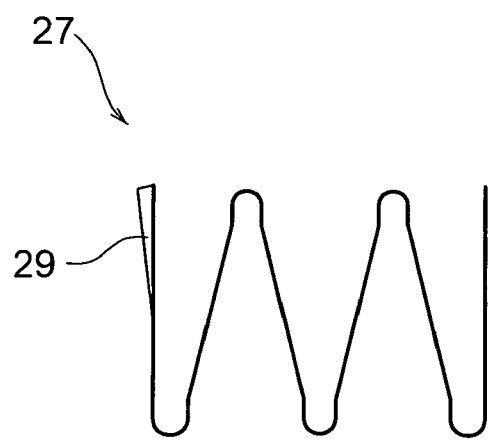
FIG. 4 is a plan view of an accordion spring.

The roller 17 is retained in each pocket 25 of a cage 23 which is supported by the output shaft 7 through a bearing 21, and is urged in a direction of leftward rotation in FIG. 2 by a pressing portion 29 of an accordion spring 27 as biasing means. FIG. 4 is a plan view of this accordion spring.

The cage 23 has an extension portion 31 which is extended in the axial direction with respect to the gear 11 serving as a cam surface side element, and a frictional drive mechanism (frictional drive means) 33 is interposed between this extension portion 31 and the gear 11. In FIGS. 1 to 3, a flange portion 35 is formed on the outer periphery of the extension portion 31, and this flange portion 35 is slidably contacted with the left end surface of the gear 11 in FIG. 1.

The frictional drive mechanism 33 is comprised of a switching plate 41 which is stationary element secured to the unrepresented housing and on which the extension portion 31 is rotatably fitted, first and second frictional plates 43 and 45 which are spline-fitted on the extension portion 31 and fixed with respect to the axial direction, and a wave spring 47 which is spline-fitted on the extension portion 31. In FIG. 1, a lubricating oil path 20 is formed in the cage 23 for supplying a lubricating oil to the frictional drive mechanism 33.

In case of the present embodiment, a centering spring (elastic retaining means) 51 having an almost C shape is fitted between the cylindrical surface 13 on the output shaft 7 and the flange portion 35 in a state of being compressed or preloaded. The centering spring 51 has first and second detent portions 53 and 55 each in an almost L shape at the free end thereof. These first and second detent portions 53 and 55 are respectively latched with the inner sides of a cut-away portion 57 formed in an upper part of the gear 11 in FIGS. 1 and 3, and also respectively latched with the inner sides of a detent hole 59 having an elliptic arcuate shape formed on the flange portion 35 of the cage 23.

The cage 23 is, as shown in FIGS. 2 and 3, elastically retained with respect to the gear 11 by the use of a spring force of the centering spring 51 at a position at which the rollers 17 are neutral with respect to the respective cam surfaces 15. The cage 23 is also formed with a stopper 61 projected toward the gear 11 in a lower part in FIGS. 1 and 3. This stopper 61 is movable within a cut-away portion 62 which is formed in a lower part of the gear 11 in FIGS. 1 and 3.

An operation of the present embodiment will be described in the following.

When the car is driven by the internal combustion engine, only the output shaft 7 is rotated in the two-way clutch 1. In this case, in the present embodiment, as shown in FIG. 2, the rollers 17 are neutral with respect to the respective cam surfaces 15, so that the rotation of the output shaft 7 is not hindered by the two-way clutch 1, and no power loss due to a dragging torque is generated.

On the other hand, when driving power of the electric motor is added in to a state in which the car is driven only by the internal combustion engine in the course of forward running, the gear 11 connected to the electric motor starts to rotate in the direction of leftward rotation in FIG. 3 in the number of rotations larger than that of the output shaft 7. Then, the rotating force of the gear 11 is transmitted to the cage 23 through the centering spring 51, and the cage 23 is to be driven with the gear 11. However, in case of the present embodiment, since the cage 23 is braked by the switching plate 41 which is frictionally engaged therewith through the frictional drive mechanism 33, the cage 23 is rotated with delay relative to the gear 11.

Figure 5:
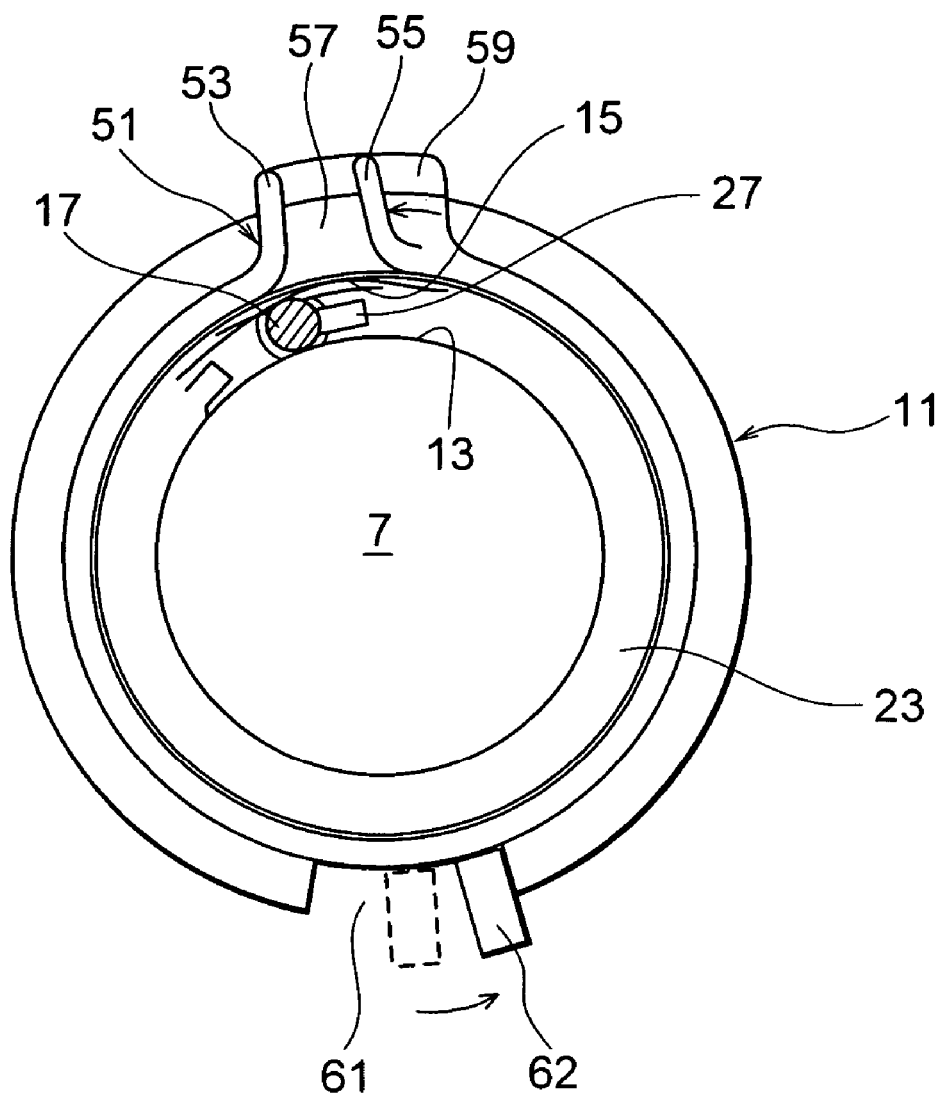
FIG. 5 is an explanatory view for illustrating an operation of the embodiment.

With this arrangement, the cage 23 is relatively rotated with respect to the gear 11 in the direction of leftward rotation while flexing the centering spring 51 serving as the elastic member, as shown in FIG. 5, until the stopper 61 thereof is contacted with an end surface of the cut-away portion 62. At this point, the rollers 17 are engaged with the respective cam surfaces 15. As a result, the gear 11 is coupled to the output shaft 7 through the rollers 17, whereby the output shaft 7 is driven by the electric motor.

In case of the present embodiment, since the lubricating oil is supplied to the contact portions between the cam surfaces 15 and the rollers 17 through the lubricating oil paths 18 and 19, friction, burning, or the like, on the cam surfaces 15, the rollers 17 and the cylindrical surface 13 can be suppressed. Though it is arranged such that, when the two-way clutch 1 is operated, the switching plate 41 and the first and second frictional plates 43 and 45 are brought into sliding contact with each other in the frictional drive mechanism 33, the lubricating oil is supplied to the frictional drive mechanism 33 through the lubricating oil path 20 so that heat generation or friction on sliding contact surfaces of these members can be suppressed.

Figure 6:
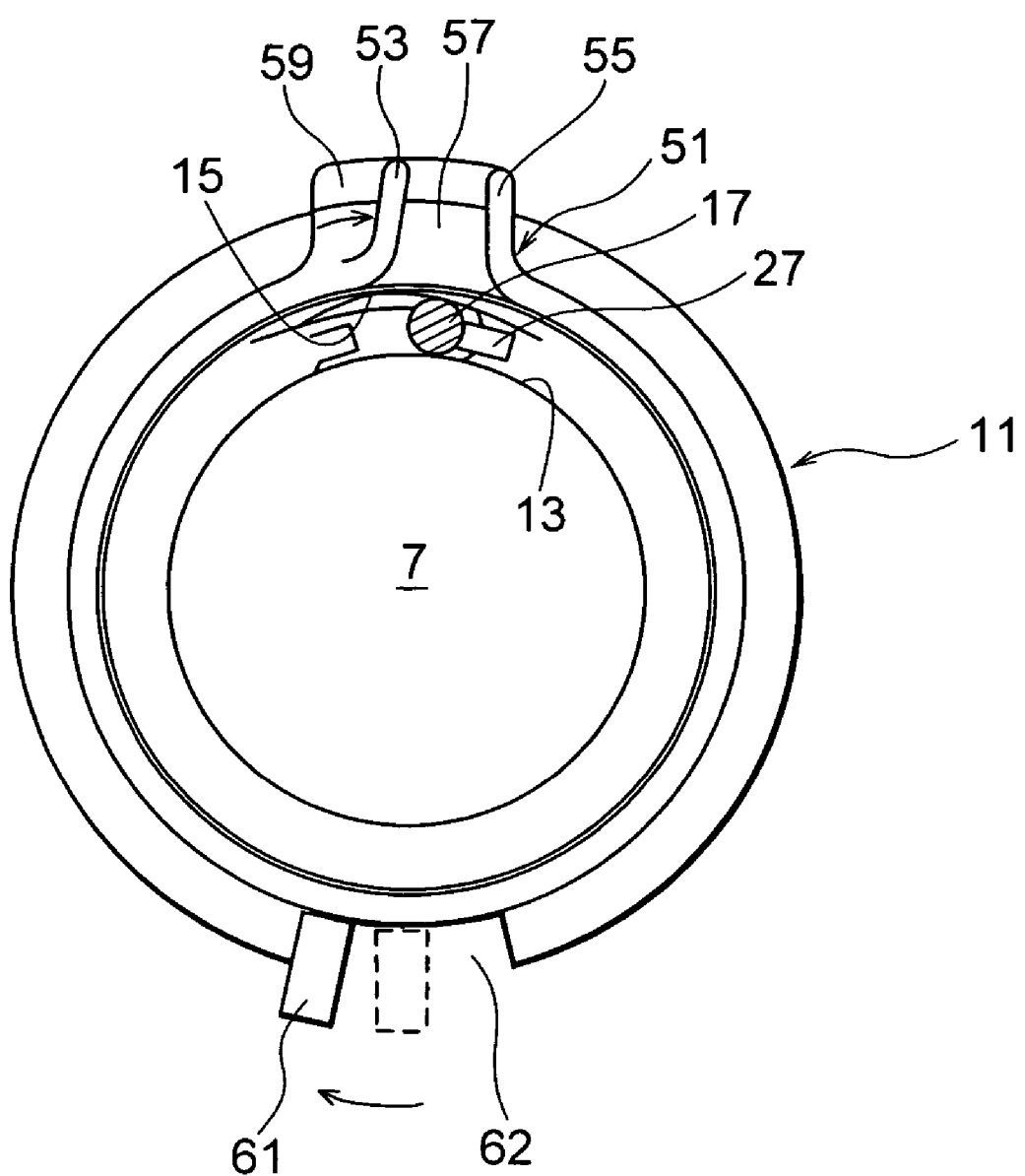
FIG. 6 is an explanatory view for illustrating the operation of the embodiment.

On the other hand, when driving power of the electric motor is added in a state in which only the internal combustion engine is used as the driving power in the course of backward running, the gear 11 connected to the electric motor starts to rotate in the direction of rightward rotation in FIG. 3 in the number of rotations larger than that of the output shaft 7. Also in this case, the cage 23 is rotated relative with the gear 11 in the direction of the rightward rotation while flexing the centering spring 51 serving as the elastic member, as shown in FIG. 6, until the stopper 61 thereof is contacted with an end surface of the cut-away portion 62. Thus, the drive of the output shaft 7 by the use of the electric motor can be realized in the same process as that in the case of the forward running.

The specific embodiment of the present invention is as described above. However, the present invention is not limited to this embodiment. For example, though the cylindrical surface is formed on the inner race element side and the cam surfaces are formed on the outer race element in the above embodiment, an arrangement may be such that the cam surfaces are formed on the inner race element and the cylindrical surface is formed in the outer race element. Also, a differential element may be used as the stationary element in the frictional drive mechanism, instead of the switching plate, the number of the frictional plates may be one, or three or more, and a spring other than the waved spring may be used as the pressing means. Further, as the means for driving the cage, an electromagnetic clutch mechanism, an oil-pressure or air-pressure cylinder, a hydraulic or electric servo, an electromagnetic valve, or the like, may be employed, instead of the frictional drive mechanism. The entire structure of the two-way clutch, the specific form of each member thereof, and the like, may be properly altered within the scope and spirit of the present invention.

According to the present invention, it is possible to obtain a two-way clutch with a less power loss in a comparatively simple structure, with which the cost or the fuel expenses can be reduced.

What is claimed is:

1. A two-way clutch comprising:
   an inner race element provided with one of a cam surface and a cylindrical surface;
   an outer race element provided with the other of the cam surface and the cylindrical surface;
   a torque transmission member interposed between said cam surface and said cylindrical surface for effecting torque transmission between said inner race element and said outer race element;
   biasing means for biasing said torque transmission member in a direction substantially along said cam surface; and
   a cage for retaining said torque transmission member and said biasing means, the cage being supported to be rotatable relative to said cam surface,
   wherein said cage is elastically retained by elastic retaining means at a position where said torque transmission member is in a neutral condition with respect to said cam surface, and said biasing means is provided on only one side of said torque transmission member, and
   wherein an extension portion is formed on said cage to be extending in an axial direction with respect to either said inner race element or said cuter race element, whichever serves as a cam surface side element having the cam surface, and
   wherein a frictional drive means is interposed between said extension portion and said cam surface side element for frictionally transmitting a rotary force of said cam surface side element to said cage to thereby rotate said cage in a same direction as said cam surface side element, but with a delay relative to said cam surface side element.

2. A two-way clutch according to claim 1, wherein said frictional drive means comprises:
   an element which is retained to be rotatable relatively to said extension portion;
   a first frictional surface which is formed integrally with or separately from said extension portion;
   a second frictional surface which is formed integrally with or separately from said element which is retained, to be slidably contacted with said first frictional surface and
   pressing means for bringing said first frictional surface into pressure contact with said second frictional surface.

3. A two-way clutch according to claim 1, wherein said cage is provided with a lubricating oil path for supplying a lubricating oil to a frictional surface of said frictional drive means.

4. A two-way clutch according to claim 2, wherein said element which is retained is stationary.

5. A two-way clutch according to claim 1, wherein said inner race element is provided with a lubricating oil path for supplying a lubricating oil to a contact portion between said inner race element and said torque transmission member.

6. A two-way clutch according to claim 2, wherein said inner race element is provided with a lubricating oil path for supplying a lubricating oil to a contact portion between said inner race element and said torque transmission member.

7. A two-way clutch according to claim 2, wherein said cage is provided with a lubricating oil path for supplying a lubricating oil to the frictional surfaces of said frictional drive means.

8. A two-way clutch according to claim 1, wherein said torque transmission member is a roller.

9. A two-way clutch according to claim 2, wherein said torque transmission member is a roller.

10. A two-way clutch comprising:
    an inner race element provided with one of a cam surface and a cylindrical surface;
    an outer race element provided with the other of the cam surface and the cylindrical surface;
    a torque transmission member interposed between said cam surface and said cylindrical surface to transmit torque between said inner race element and said outer race element, said torque transmission member being biased along said cam surface from only one side thereof;
    a biasing member which biases said torque transmission member along said cam surface; and
    a cage retaining said torque transmission member and said biasing member, the cage being supported to be rotatable relative to said cam surface,
    wherein said cage is retained at a position where said torque transmission member is in a neutral condition with respect to said cam surface,
    wherein an extension portion is formed on said cage to be extending in an axial direction with respect to either said inner race element or said outer race element, whichever serves as a cam surface side element having the cam surface, and
    wherein a frictional drive mechanism is interposed between said extension portion and said cam surface side element to frictionally transmit a rotary force of said cam surface side element to said cage to thereby rotate said cage in a same direction as said cam surface side element, but with a delay relative to said cam surface side element.

11. A two-way clutch according to claim 10, wherein said frictional drive mechanism comprises:
    a first frictional surface rotatable with said extension portion;
    a second frictional surface to be engaged with said first frictional surface to brake rotation of said extension portion; and
    a pressing device which urges said first and second frictional surfaces into engagement with each other.

12. A two-way clutch according to claim 10, wherein said cage is provided with a lubricating oil path for supplying a lubricating oil to a frictional surface of said frictional drive mechanism.

13. A two-way clutch according to claim 11, wherein said second frictional surface is stationary.

14. A two-way clutch according to claim 10, wherein said inner race element is provided with a lubricating oil path for supplying a lubricating oil to a contact portion between said inner race element and said torque transmission member.

15. A two-way clutch according to claim 11, wherein said inner race element is provided with a lubricating oil path for supplying a lubricating oil to a contact portion between said inner race element and said torque transmission member.

16. A two-way clutch according to claim 11, wherein said cage is provided with a lubricating oil path for supplying a lubricating oil to said frictional surfaces of said frictional drive mechanism.

17. A two-way clutch according to claim 10, wherein said torque transmission member is a roller.

18. A two-way clutch according to claim 11, wherein said torque transmission member is a roller.

* * * * *